United States Patent Office 3,778,439
Patented Dec. 11, 1973

3,778,439
BINUCLEAR N-HETEROCYCLIC POLYGLYCIDYL COMPOUNDS
Juergen Habermeier, Alemannenweg 12, Pfeffingen, Basel, Switzerland, and Daniel Porret, Zeigerweg 37, Binningen, Switzerland
No Drawing. Filed Oct. 28, 1971, Ser. No. 193,559
Claims priority, application Switzerland, Nov. 2, 1970, 16,201/70
Int. Cl. C07d 49/32, 51/18
U.S. Cl. 260—256.4 C                 7 Claims

ABSTRACT OF THE DISCLOSURE

Polyglycidyl compounds are manufactured by reacting adducts of 1 mol of a diisocyanate and 2 mols of a hydantoin or dihydrouracil, for example N,N'-bis-(5,5-dimethylhydantoin-1-carbonyl) - hexamethylenediamine, with an epihalogenohydrin or β-methylepihalogenohydrin, for example epichlorohydrin, in the presence of a catalyst. Example: the new compound of the formula

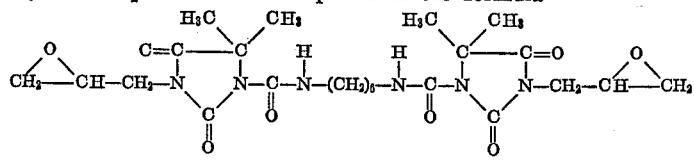

The new polyglycidyl compounds can be converted, by means of the customary curing agents for epoxide resins, such as dicarboxylic acids or polyamines, into mouldings having good mechanical and dielectric properties.

---

The subject of the present invention are new binuclear N-heterocyclic polyglycidyl compounds of the formula

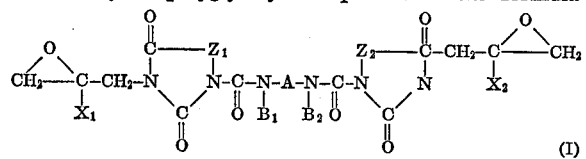

wherein A denotes a divalent aliphatic, cycloaliphatic, cycloaliphatic-aliphatic, araliphatic, aromatic or heterocyclicaliphatic radical, $Z_1$ and $Z_2$ each represent a divalent radical of the formula

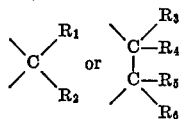

wherein $R_1$ and $R_2$ each denote a hydrogen atom or an aliphatic, cycloaliphatic, araliphatic or aromatic hydrocarbon radical, or wherein $R_1$ and $R_2$ together form a divalent aliphatic or cycloaliphatic hydrocarbon radical, wherein $R_3$ and $R_5$ each denote a hydrogen atom or an aliphatic, cycloaliphatic, araliphatic or aromatic hydrocarbon radical and wherein $R_4$ and $R_6$ each represent a hydrogen atom or an alkyl radical, $X_1$ and $X_2$ each denote a hydrogen atom or a methyl group and $B_1$ and $B_2$ each denote a hydrogen atom, a glycidyl group or a β-methylglycidyl group.

In the above Formula I, A preferably denotes a divalent aliphatic, cycloaliphatic, cycloaliphatic-aliphatic, araliphatic or aromatic hydrocarbon radical or a N-heterocyclic-aliphatic radical; $R_1$ and $R_2$ preferably denote hydrogen atoms or lower alkyl radicals with 1 to 4 carbon atoms, or $R_1$ and $R_2$ together denote the tetramethylene or pentamethylene radical; $R_3$, $R_4$, $R_5$ and $R_6$ preferably denote hydrogen atoms or lower alkyl radicals with 1 to 4 carbon atoms, $X_1$ and $X_2$ preferably denote hydrogen atoms and $B_1$ and $B_2$ preferably denote hydrogen atoms or glycidyl groups.

The new polyglycidyl compounds of the Formula I are as a rule resins which are viscous to solid at room temperature and which can be converted, either as they are or mixed with reactive diluents, by means of customary curing agents for epoxide resins, such as dicarboxylic anhydrides or polyamines, into mouldings having good mechanical and electrical properties.

Alongside the casting resin field, preferred fields of use are above all uses as powder resins, such as fluidised bed coating powders and compression moulding powders.

The new polyepoxides of the Formula I are manufactured according to methods which are in themselves known. A first, preferred process variant (a), according to the invention, for their manufacture is characterised in that, in a compound of the formula

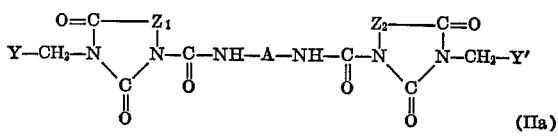

or of the formula

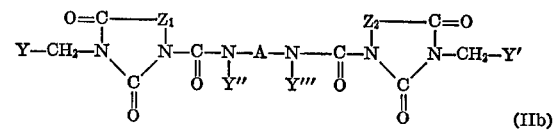

wherein A, $Z_1$ and $Z_2$ have the same meaning as in the Formula I and the radicals Y, Y', Y" and Y'" are radicals which can be converted into 1,2-epoxyethyl or 1-methyl-1,2-epoxyethyl radicals, these radicals are converted into epoxyethyl or 1-methyl-1,2-epoxyethyl radicals.

A radical Y, Y', Y" or Y'" which can be converted into the 1,2-epoxyethyl radical or 1-methyl-1,2-epoxyethyl radical is above all a hydroxyhalogenoethyl radical carrying the functional groups on different carbon atoms, especially a 2-halogeno-1-hydroxyethyl radical or a 2-halogeno-1-hydroxy-1-methylethyl radical. Halogen atoms are here especially chlorine or bromine atoms. The reaction takes place in the customary manner above all in the presence of agents which split off hydrogen halide, such as strong alkalis, for example anhydrous sodium hydroxide or aqueous sodium hydroxide solution. However, other strongly alkaline reagents, such as potassium hydroxide, barium hydroxide, calcium hydroxide, sodium carbonate or potassium carbonate can also be used.

A further radical Y, Y', Y" or Y'" which can be converted into the 1,2-epoxyethyl radical is, for example, the ethenyl radical which can be converted into the 1,2-epoxyethyl radical in a known manner, such as, above all, by reaction with hydrogen peroxide or per-acids, for example peracetic, perbenzoic or permonophthalic acid.

The starting substances of the Formulae IIa or IIb are obtained in a manner which is in itself known. Thus, for example, a compound of the formula

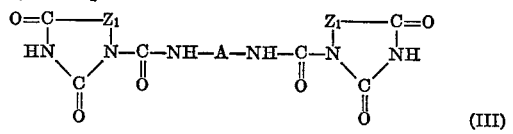

wherein A, $Z_1$ and $Z_2$ have the same meaning as in the Formula I, can be reacted with a compound of the formula Y—CH₂—Hal, wherein Hal represents a halogen atom and Y has the abovementioned meaning. Preferably, the compound of the formula III is reacted with an epihalogenohydrin or β-methylepihalogenohydrin, above all epichlorohydrin or β-methylepichlorohydrin, in the presence of a catalyst such as, in particular, a tertiary amine, a quaternary ammonium base or a quaternary ammonium salt. Suitable catalysts for the addition of epichlorohydrin or β-methylepichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium trichloride, benzyltrimethylammonium acetate and methyltriethylammonium chloride; hydrazines having a tertiary nitrogen atom, such as 1,1-dimethylhydrazine, which can also be employed in a quarternised form; alkali halides, such as lithium chloride, potassium chloride, and sodium chloride, bromide or fluoride; and also ion exchange resins having tertiary or quaternary amino groups, as well as ion exchangers having acid amide groups. Basic impurities which can occur in technical commercially available forms of the starting compounds, can also act as catalysts. In such cases it is not necessary to add a special catalyst.

Depending on the molar ratio of the compound of the formula Y—CH₂—Hal to the compound of the Formula III, and depending on the radical A, 2 to 4 mols of the compound Y—CH₂—Hal are added to 1 mol of the compound (III). The NH groups present in the heterocyclic ring in general react more easily than the active hydrogens of the urea groups, so that when using about 2 mols of compound Y—CH₂—Hal per 1 mol of compound (III), compounds of the Formula IIa are as a rule first produced. Compounds of the Formula IIa are above all formed if a stoichiometric excess of compound $$Y—CH_2—Hal$$

is employed and furthermore the radical A is an aromatic radical or the urea groups >N—CO—NH— are directly bonded to aromatic rings.

The manufacture of the intermediate products of the Formula IIa or IIb and of the end products of the Formula III is appropriately carried out in a single two-stage process without isolating the intermediate products (IIa) or (IIb).

A preferred embodiment of the process is therefore, for example, to react an epihalogenohydrin or β-methylepihalogenohydrin, preferably epichlorohydrin or β-methylepichlorohydrin, in the presence of a catalyst, such as, preferably, a tertiary amine, a quaternary ammonium base or a quaternary ammonium salt, with a compound of the Formula III and, in a second stage, to treat the resulting product, containing halogenohydrin groups, with agents which split off hydrogen halide. In these reactions, the procedure described above is followed, and the compounds mentioned above can be used as catalysts for the addition of epihalogenohydrin or β-methylepihalogenohydrin, or for the dehydrohalogenation. Particularly good yields are obtained if an excess of epichlorohydrin or β-methylepichlorohydrin is used. During the first reaction, before the addition of alkali, a partial epoxidation of dichlorohydrin or of the β-methyldichlorohydrin of the compound (III) already occurs. The epichlorohydrin or β-methylepichlorohydrin, which act as hydrogen chloride acceptors, have then been partially converted into glycerine-dichlorohydrin or into β-methylglycerine-dichlorohydrin.

The symmetrical compounds of the Formula III can be manufactured by addition of 1 mol of a diisocyanate of the formula $$O=C=N—A—N=C=O \quad (IV)$$

to 2 mols of a N-heterocyclic compound of the formula

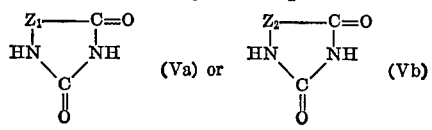

Unsymmetrical compounds of the Formula III can be obtained, for example, if 1 mol of a diisocyanate (IV) is first added to 1 mol of a heterocyclic compound of the Formula Va and the resulting intermediate product is added, in a second stage, to 1 mol of a heterocyclic compound (Vb), which differs from the compound (Va), to give the compound (III).

The addition reaction is as a rule carried out at elevated temperature, for example at 60–200° C., with exclusion of atmospheric moisture and appropriately in the absence of solvents.

Possible diisocyanates of the Formula IV are those of the aliphatic, cycloaliphatic, araliphatic, aromatic and heterocyclic-aliphatic series.

As diisocyanates of the aliphatic, cycloaliphatic and araliphatic series there may be mentioned: ethylene diisocyanate, trimethylenediisocyanate, tetramethylenediisocyanate, hexamethylenediisocyanate, decamethylenediisocyanate, 2,2,4- and 2,4,4-trimethylhexamethylenediisocyanate or their technical mixtures; diisocyanates of the formula OCN—Y—NCO, wherein Y denotes the hydrocarbon radical of an optionally hydrogenated dimerised fatty alcohol; cyclopentylene-1,3-diisocyanate, cyclohexylene-1,4-, -1,3- or -1,2-diisocyanate, hexahydrotoluylene-2,4- or -2,6-diisocyanate, 3,5,5 - trimethyl-3-isocyanatomethyl-cyclohexance-1-isocyanate (="isophorone-diisocyanate"); dicyclohexyl-methane - 4,4'-diisocyanate; o-, m- and p-xylylene-α,α'-diisocyanate.

As diisocyanates of the aromatic series there may be mentioned:

toluylene-2,4-diisocyanate,
toluylene-2,6-diisocyanate or their technical mixtures;
diphenylmethane-4,4'-diisocyanate,
naphthalene-1,5-diisocyanate,
3,3'-dimethyl-4,4'-diisocyanate,
3,3'-dimethyl-biphenyl-4,4'-diisocyanate,
3,3'-dimethoxy-4,4'-diphenyl-diisocyanate,
3,3'-dichloro-diphenyl-4,4'-diisocyanate,
4,4'-diphenyl-diisocyanate,
diphenyldimethyl-methane-4,4'-diisocyanate,
p,p'-dibenzyl-diisocyanate,
phenylene-1,4-diisocyanate,
phenylene-1,3-diisocyanate,
2,3,5,6-tetramethyl-p-phenylenediisocyanate;

the uretdione-diisocyanate obtainable by dimerisation of aromatic diisocyanates, such as, for example, 2,4-toluylene-diisocyanate, for example, 1,3-bis-(4'-methyl-3'-isocyanatophenyl-)-uretdione of the formula

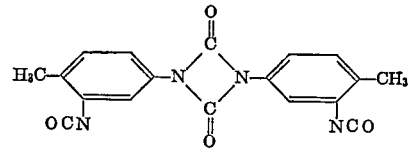

N,N'-di-(4-methyl-3-isocyanato-phenyl)-urea.

As diisocyanates of the heterocyclic-aliphatic series there may be mentioned:

1,3-di-(γ-isocyanatopropyl)-hydrantoin,
1,3-di-(γ-isocyanato-propyl)-5-methyl-hydantoin,
1,3-di-(γ-isocyanatopropyl)-5,5-dimethyl-hydantoin,
1,3-di-(γ-isocyanatopropyl)-5-methyl-5-ethyl-hydantoin,
1,3-di-(γ-isocyanatopropyl)-5-ethyl-hydantoin,
1,3-di-(γ-isocyanatopropyl)-5-propyl-hydantoin,
1,3-di-(γ-isocyanatopropyl)-5-isopropyl-hydantoin,
1,3-di-(γ-isocyanato-propyl)-1,3-diazaspiro-(4.4)-nonane-2,4-dione and
1,3-di-(γ-isocyanatopropyl)-1,3-diaza-spiro-(4.5)-decane-2,4-dione,
1,3-di-(γ-isocyanatopropyl)-5,5-dimethyl-5,6-dihydrouracil and
1,3-di-(γ-isocyanatopropyl)-6-methyl-5,6-dihydrouracil;
1,1'-methylene-bis-(3-γ-isocyanatopropyl-hydantoin);

1,1'-methylene-bis-(3-γ-isocyanatopropyl-5,5-dimethyl-hydantoin);
1,1'-methylene-bis-(3-γ-isocyanatopropyl-5-methyl-5-ethylhydantoin);
bis-(1'-γ-isocyanatopropylhydantoinyl-3')-methane;
1,2-bis-(1'-γ-isocyanatopropyl-5',5'-dimethyl-hydantoinyl-3')-ethane;
1,4-bis-(1'-γ-isocyanatopropyl-5'-methyl-5'-ethyl-hydantoinyl-3')-butane;
1,6-bis-(1'-γ-isocyanatopropyl-5'-isopropylhydantoinyl-3')-hexane;
1,12-bis-(1'-γ-isocyanato-propyl-5',5'-pentamethylene-hydantoinyl-3')-dodecane and
β,β'-bis-(1'-γ-isocyanatopropyl-5',5'-dimethylhydantoinyl-3')-diethyl-ether.

The mononuclear N-heterocyclic compounds of the Formulae Va or Vb used for the manufacture of the compounds of the Formula III are above all hydantoin, hydantoin derivatives, dihydrouracil and dihydrouracil derivatives.

Hydantoin and its preferred derivatives correspond to the general formula

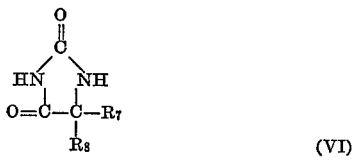

(VI)

wherein $R_7$ and $R_8$ each denote a hydrogen atom or a lower alkyl radical with 1 to 4 carbon atoms, or wherein $R_7$ and $R_8$ together form a tetramethylene or pentamethylene radical. Hydantoin, 5-methyl-hydantoin, 5-methyl-5-ethylhydantoin, 5-n-propyl-hydantoin, 5-isopropyl-hydantoin, 1,3-diaza-spiro(4,5)-decane - 2,4 - dione, 1,3-diaza-spiro(4.4)-nonane-2,4-dione and preferably 5,5-dimethyl-hydantoin may be mentioned.

Dihydrouracil (=2,4-dioxo-hexahydropyrimidine) and its preferred derivatives correspond to the general formula

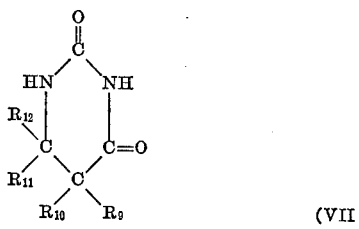

(VII)

wherein $R_9$ and $R_{10}$ both denote a hydrogen atom or identical or different alkyl radicals, preferably alkyl radicals with 1 to 4 carbon atoms, and $R_{11}$ and $R_{12}$ independently of one another each denote a hydrogen atom or an alkyl radical.

Preferably, in the above formula, the two radicals $R_7$ and $R_8$ denote methyl groups, $R_9$ denotes a hydrogen atom or a lower alkyl radical with 1 to 4 carbon atoms and $R_{10}$ denotes a hydrogen atom. 5,6-dihydrouracil, 5,5-dimethyl-5,6-dihydrouracil (2,4-dioxo-5,5-dimethylhexahydropyrimidine) and 5,5-dimethyl-6-isopropyl-5,6-dihydro-uracil (2,4-dioxo - 5,5 - dimethyl-6-isopropylhexahydropyrimidine) may be mentioned.

In the reaction of hydantoins or dihydrouracils with isocyanates, only the weakly acid or neutral NH groups in the 1-position of the ring react, whilst the more strongly acid NH group in the 3-position of the ring is practically not attacked. The compounds of the Formula III can therefore be obtained in practically theoretical yield by reaction of a diisocyanate with hydantoins or dihydrouracils in the molar ratio of 1:2.

A second preferred process variant (b), according to the invention, for the manufacture of the polyepoxides of the Formula I is characterised in that 1 mol of a diisocyanate of the formula

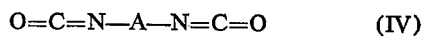

$$O=C=N-A-N=C=O \qquad (IV)$$

is reacted with 2 mols of a N-heterocyclic monoglycidyl compound of the formula

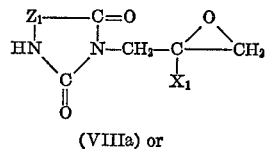

(VIIIa) or

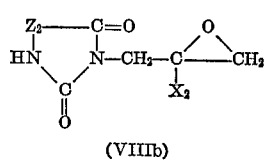

(VIIIb)

wherein the symbols A, $Z_1$, $Z_2$, $X_1$ and $X_2$ have the same meaning as in the Formula I, whilst warming.

The addition reaction is appropriately carried out in the temperature range of 60–200° C., with exclusion of atmospheric moisture and preferably in the absence of solvents.

The same diisocyanates of the Formula IV are employed as in the manufacture of the compounds of the Formula III, described above.

The N-heterocyclic monoglycidyl compounds of the Formula VIIIa or VIIIb can be manufactured in a known manner by reacting 1 mol of a N-heterocyclic compound of the Formula Va or Vb, as used above for the manufacture of compounds of the Formula III, in a first stage with 1 mol of an epihalogenohydrin or β-methylepihalogenohydrin, prefrably with 1 mol of epichlorohydrin or β-methylepichlorohydrin, in the presence of a catalyst, such as, preferably, a tertiary amine, a quaternary ammonium base or a quaternary ammonium salt, such as benzyltrimethylammonium chloride, under conditions in which only the more strongly acid endocyclic NH group in the 3-position of the ring is substituted, so as to give the halogenohydrin, and in a second stage treating the resulting product containing halogenohydrin groups with agents which split off hydrogen halide, preferably strong alkalis, such as sodium hydroxide.

Possible N-heterocyclic compounds of the Formula Va or Vb are, as mentioned above, hydantoin, hydantoin derivatives, dihydrouracil and dihydrouracil derivatives, and above all those of the Formulae VI and VII.

In the hydantoins and dihydrouracils in question the NH group located in the 3-position, which lies between the two carbonyl groups, is of acid character and can, for example, be determined quantitatively by potentiometric titration with alkali.

Particularly good yields of monoglycidyl compound VIIIa or VIIIb are obtained if a stoichiometric excess of epichlorohydrin or methylepichlorohydrin over the amount required for addition to the NH group in the 3-position of the heterocyclic ring is employed in the reaction mixture. During the catalytic addition of the epichlorohydrin in the first reaction stage, before the addition of alkali, a partial epoxidation of the dichlorohydrin of the hydantoin already takes place. The epichlorohydrin, which acts as a hydrogen chloride acceptor, is then partly converted into glycerine-dichlorohydrin.

In the reaction of the hydantoins or dihydrouracils, described above, with a stoichiometric excess of epichlorohydrin over the amount required for the monoglycidylation in the presence of a catalyst, the acid NH group in the 3-position of the ring reacts more rapidly than the NH group in the 1-position of the ring. It is therefore possible to react the more strongly acid NH group substantially quantitatively with the epichlorohydrin before the more weakly acid NH group has significantly reacted. If, therefore, the reaction leading to the chlorohydrin is interrupted at the right moment (the consumption of about 1 mol of epichlorohydrin per mol of the hydantoin or dihydrouracil being proved by means of a sample of the reaction mixture) and the mixture is then allowed to react with the equivalent amount of alkali, the monoglycidyl derivative of the Formula VIIIa or VIIIb is obtained as the main product.

The new polyglycidyl compounds of the Formula I, according to the invention, react with the customary curing agents for polyepoxide compounds and can therefore be cross-linked or cured by the addition of such curing agents, analogously to other polyfunctional epoxide compounds or epoxide resins. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylene diamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine - 1,3, bis - (4 - amino-3-methylcyclohexyl)-methane, 3,5,5 - trimethyl-3-(aminomethyl)-cyclohexylamine ("isophoronediamine"), Mannich bases, such as 2,4,6 - tris - (dimethylaminomethyl)-phenol, m-phenylenediamine, p - phenylenediamine, bis - (4-aminophenyl)-methane, bis - (4 - aminophenyl) - sulphone and m-xylylenediamine; N-(2-aminoethyl) - piperazine; adducts of acrylonitrile or monoepoxides, such as ethylene oxide or propylene oxide, to polyalkylene-polyamines, such as diethylene triamine or triethylenetetramine; adducts of polyamines, such as diethylenetriamine or triethylenetetramine in excess, and polyepoxides, such as diomethane-polyglycidyl-ethers; ketimines, for example from acetone or methyl ethyl ketone and bis(p-amino-phenyl)-methane; adducts of monophenols or polyphenols and polyamines; polyamides, especially those from aliphatic polyamines, such as diethylene-triamine or triethylenetetramine, and dimerised or trimerised unsaturated fatty acids, such as dimerised linseed oil fatty acid ("Versamid"); polymeric polysulphides ("Thiokol"); dicyandiamide, aniline-formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenyl-phosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetraydrophthalic anhydride (= methylnadic anhydride), 3,4,5,6,7,7 - hexachloro - 3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2-ethyl-4-methyl-imidazole, 4-aminopyridine and triamylammonium phenolate, and also alkali metal alcoholates, such as, for example, sodium hexanetriolate. In the amine curing reaction, monophenols or polyphenols, such as phenol or diomethane, salicylic acid or thiocyanates, can for example be employed as accelerators.

The term "curing" as used here denotes the conversion of the above-mentioned polyepoxides into insoluble and infusible, crosslinked products, and in particular, as a rule, with simultaneous shaping to give mouldings, such as castings, pressings or laminates and the like, or to give "sheet-like structures," such as coatings, coverings, lacquer films or adhesive bonds.

Depending on the choice of the curing agent, the curing reaction can be carried out at room temperature (18–25° C.) or at elevated temperature (for example 50–180° C.).

The curing can, if desired, also be carried out in 2 stages, by first prematurely stopping the curing reaction or carrying out the first stage at only moderately elevated temperature, whereby a still fusible and soluble, curable precondensate (a so-called "B-stage") is obtained from the epoxide component and the curing agent component. Such a precondensate can, for example, be used for the manufacture of "Prepregs," compression moulding compositions or sintering powders.

A further subject of the present invention are therefore curable mixtures which are suitable for the manufacture of mouldings, including sheet-like structures, and which contain the polyglycidyl compounds according to the invention, optionally together with other polyepoxide compounds and also curing agents for epoxide resins, such as polyamines or polycarboxylic acid anhydrides.

The polyepoxides according to the invention or their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention there may, for example, be mentioned: coal tar, bitumen, glass fibres, boron fibres, carbon fibres, asbestos fibres, natural and synthetic textile fibres, such as polyester fibres, polyamide fibres and polyacrylonitrile fibres; polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("Aerosil"), lithopone; barytes, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycols can, for example, be employed.

As flow control agents when employing the curable mixtures, especially in surface protection, silicones, cellulose acetobutyrate, polyvinylbutyral, waxes, stearates and the like (which in part also used as mould release agents) may, for example, be added.

Particularly for use in the lacquer field, the polyepoxide compounds according to the invention can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, rolls).

The curable epoxide resin mixtures according to the invention are above all employed in the fields of surface protection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millilitre to the gram.

In order to determine the mechanical and electrical properties of the curable mixtures described in the examples which follow, sheets of size 92 x 41 x 12 mm. were manufactured for determining the flexural strength, deflection, impact strength and water absorption. The test specimens (60 x 10 x 4 mm.), for determining the water absorption and for the flexural test and impact test (VSM 77,103 and VSM 77,105 respectively) were machine from the sheets.

For determining the heat distortion point according to Martens (DIN 53,458), test specimens of size 120 x 15 x 10 mm. were cast in each case.

To test the arcing resistance and tracking resistance (VDE 0303), sheets of size 120 x 120 x 4 mm. were cast.

(A) MANUFACTURE OF THE STARTING SUBSTANCES (1) Adducts of 1 mol of Diisocyanate and 2 Mols of a Hydantoin or Dihydrouracil (a) N,N'-bis-(5,5-dimethyl-hydantoin-1-carbonyl)-hexamethylenediamine Adduct of 1 mol if hexamethylenediisocyanate and 2 mols of 5,5-dimethylhydantoin: A paste of 384.5 g. of 5,5-dimethylhydantoin (3.0 mols) and 252.2 g. of hexamethylenediisocyanate (1.5 mols) is stirred, with exclusion of atmospheric moisture, in a dry glass flask equipped with a stirrer, thermometer and reflux condenser. This thick paste is heated to 145–150° C., whereby a colourless, clear melt is produced. The reaction is slightly exothermic. After a total of 3 hours, the melt is poured out onto a metal sheet to cool. The product solidifies to clear, transparent, yellowish-coloured glassy lumps.

The crude product can be purified by recrystallisation from ethanol. Colourless crystals melting at 226–229° C. are obtained. Elementary analysis gives the following values:

Found (percent): C, 50.74; H, 6.66; N, 19.90. Calculated (percent): C, 50.94; H, 6.65; N, 19.80.

The mass spectrum shows the molecule-ion at 424 mass units (MU) (theoretical molecular weight 424.5). Furthermore, characteristic fragment ions are observed at MU=297; MU=296; MU=240; MU=184; and

MU=141

The proton-magnetic resonance spectrum (60 Mc-HNMR, recorded in deuterodimethylsulphoxide (DMSO$_d$) at 35° C., as an 0.4 molar solution, against tetramethylsilane (TMS) as the internal standard) also shows, for example through the ratio of the methyl groups present on the hydantoin ring ($\delta$=1.4–1.5, doublet) to the "internal" methylene groups (—CH$_2$—)$_4$ ($\delta$=1.65–1.73, multiplet) of 3:2, that the substance of the structure given below has been obtained:

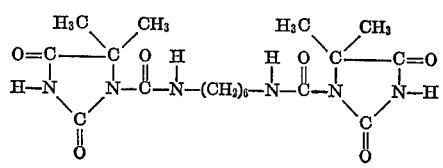

(b) N,N'-bis-(5,5-dimethyl-hydantoin-1-carbonyl)-3,5,5-trimethyl-3-aminomethyl-cyclohexylamine-1

A mixture of 512 g. (4 mols) of 5,5-dimethylhydantoin and 444 g. (2 mols) of 3,5,5-trimethyl-3-isocyanatomethylcyclohexane-1-isocyanate ("isophoronediisocyanate") is stirred for three hours at 130–140° C. in a glass apparatus such as that described under instruction (A)(1)(a). A completely clear, colourless melt results, which is poured out onto a metal sheet to cool. After grinding the material, a pale yellow powder, which melts at 112–114° C. is obtained in quantitative yield. The elementary analysis shows a nitrogen content of 12.5% (calculated, 12.56%). The mass spectrum shows, in addition to the molecule-ion at 478 MU, the following characteristic ions: MU=479 (=478+H); MU=323 (=478−155), MU=294,

MU=238, 227

The infrared and nuclear resonance spectra also agree with the following structure of the substance obtained:

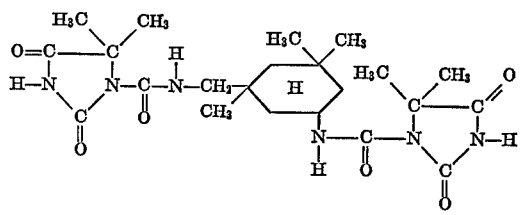

(c) N,N'-bis-(5,5-dimethyl-hydantoin-1-carbonyl)-toluylene-2,4-diamine

Adduct of 1 mol of toluylene-2,4-diisocyanate and 2 mols of 5,5-dimethylhydantoin: 3 mols of 5,5-dimethylhydantoin (384.5 g.) are reacted with 1.5 mols of toluylene-2,4-diisocyanate (261 g.) at 145–150° C. bath temperature, analogously to the procedure described above under instruction (A)(1)(a). The reaction time is 2½ hours and the reaction is slightly exothermic. Working up takes place analogously to the procedure described above under (A)(1)(a). The product, which can be recrystallised from alcohol/dimethylformamide, melts at 266–267° C. and has the following structure:

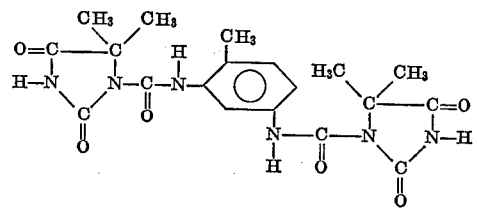

(d) N,N'-bis-(5,5-dimethyl - 6 - isopropyl - 5,6 - dihydrouracil - 1 - carbonyl)-3,5,5-trimethyl - 3 - aminomethyl-cyclohexylamine-1

Adduct of 1 mol of "isophoronediisocyanate" and 2 mols of 5,5-dimethyl-6-isopropyl-5,6-dihydrouracil:2 mols of 5,5-dimethyl-6-isopropyl-5,6-dihydrouracil (369 g.) are added to 1 mol of isophoronediisocyanate (222.3 g.) as described above under instruction (A)(1)(a). The reaction is effected in 4½ hours at 150–162° C. A crude product, which can be recrystallised from acetone, is obtained in quantitative yield; the purified adduct melts at 213–215° C. Elementary analysis shows: 60.9% C (theory: 61.0) and 14.2% N (theory: 14.23% N).

The mass spectrum shows the expected molecule-ion at 590 MU and further characteristic ions at MU=591, 407, 379, 378 and 363. The substance obtained thus has the following structure:

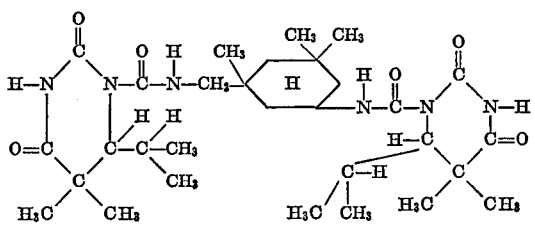

(e) N,N'-bis-(5,5-dimethyl-6-isopropyl-5,6-dihydro-uracil-1-carbonyl)-hexamethylenediamine 168.2 g. of hexamethylenediisocyanate (1.0 mol) are reacted with 368.5 g. of 5,5-dimethyl-6-isopropyl-5,6-dihydrouracil (2.0 mols) for 2 hours at 170 to 200° C., analogously to the procedure described above under (A)(1)(a). The clear melt is worked up as described above under (A)(1)(a). An adduct melting at 65–70° C. is obtained in 100% crude yield.

It consists of the compound of the formula

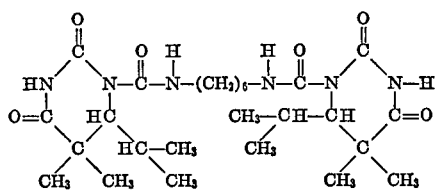

(2) Monoglycidyl Derivatives of 1 Mol of Epichlorohydrin and 1 Mol of a Hydantoin or Dihydrouracil (a) 3-glycidyl-5,5-dimethyl-hydantoin A mixture of 128 g. of 5,5-dimethylhydantoin (1 mol), 2775 g. of epichlorohydrin (30 mols) and 0.66 g. of benzyltrimethylammonium chloride was heated to 118° C. for 95 minutes. A sample withdrawn from the reaction mixture then shows, after distilling off the excess epichlorohydrin and the 1,3-dichloro-2-propanol formed, an epoxide content of 2.78 epoxide equivalents/kg. The reaction mixture was cooled to 60° C. and 42.3 g. of finely powdered sodium hydroxide (1.05 mols) were added over the course of 20 minutes in small portions, with vigorous stirring. After completion of the addition, the mixture was stirred for a further 30 minutes at 60° C. Thereafter the water produced in the reaction was removed by azeotropic distillation together with a part of the epichlorohydrin at 60° C. and 35 mm. Hg. After cooling, the sodium chloride produced was filtered off and the clear filtrate was first concentrated at 30 mm. Hg and then in a high vacuum.

198.5 g. (theory for (N)3-glycidyl-5,5-dimethyl-hydantoin: 184 g.) of a pale yellow-coloured crystal paste were obtained having an epoxide content of 4.96 epoxide equivalents/kg. (theory for (N)3-glycidyl-5,5-dimethyl-hydantoin: 5.43 epoxide equivalents/kg.).

The product was recrystallised once from methyl ethyl ketone and once from acetone and the (N)3-glycidyl-5,5-dimethyl-hydantoin was obtained as a pure white crystal powder.

Melting point 97–98° C.
Epoxide content 5.45 epoxide equivalents/kg. (theory 5.43)
Chlorine content 0.2%.

*Elementary analysis.*—Found (percent): C, 52.11; H, 6.57; N, 15.00. Calculated (percent): C, 52.16; H, 6.57; N, 15.21.

The product substantially consists of 3-glycidyl-5,5-dimethyl-hydantoin of the structure:

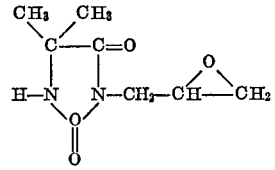

(b) 3-glycidyl-5,5-dimethyl-6-isopropyl-5,6-dihydrouracil

A solution of 552.6 g. of 5,5-dimethyl-6-isopropyl-5,6-dihydrouracil (3.0 mols) in 2775 g. of epichlorohydrin (30.0 mols), with the addition of 149 g. of tetraethylammonium chloride is stirred to 3 hours under reflux at 117–119° C. Thereafter dehydrohalogenation is carried out with 300.0 g. of 50% strength sodium hydroxide solution over the course of 120 minutes, with vigorous stirring and continuous azeotropic circulatory distillation, the water formed being separated off. After a further 10 minutes, no further water separates off.

Thereafter the mixture is cooled to 40° C. and the sodium chloride produced in the reaction is removed by filtration. The sodium chloride layer is rinsed with 10 ml. of epichlorohydrin. The combined epichlorohydrin solutions are extracted by shaking with 150 ml. of water. After separating off the aqueous phase, the remainder is concentrated on a rotary evaporator at 60° C. under a water-pump vacuum. It is then dried to constant weight at 75° C. under 0.2 mm. Hg. 721 g. of a colourless to pale yellow, clear, highly viscous resin (100% of theory) are obtained. The epoxide content is 3.98 g. equivalents/kg. (95.7% of theory).

The product essentially consists of 3-glycidyl-5,5-dimethyl-6-isopropyl-5,6-dihydrouracil of the following structure:

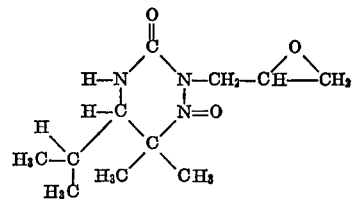

(B) MODEL EXPERIMENTS (a) The model experiment which follows shows that organic isocyanates react with the $N_1$—H group of hydantoins to give stable adducts. With 5,5-dimethylhydantoin with phenylisocyanate as the model substances, the reaction takes place as follows:

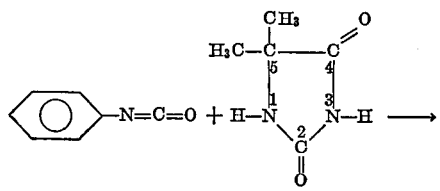

This reaction takes place smoothly and with good yields. It was found that the derivatives thus obtained are at least as heat-stable as the urethanes obtainable from the corresponding isocyanates; this was examined by means of the following experiments:

A mixture of 128.1 g. of 5,5-dimethylhydantoin (1 mol) and 119.2 g. of phenylisocyanate (1 mol) is first introduced, at room temperature, into a 500 ml. glass flask eqiupped with stirrer, thermometer and reflux condenser. The resulting paste is heated to 150° C. internal temperature over the course of 15 minutes, whilst stirring. After about 80 minutes under the conditions mentioned, a clear, mobile melt results. To complete the reaction, this is stirred for a further 2 hours at 160° C. On cooling, the mass immediately crystallises. 233 g. of light yellow crystals (yield: 94.3% of theory) are obtained.

For purification, the product is recrystallised from absolute ethanol. Practically colourless, fine crystals are obtained in 69.6% yield of pure substance (172 g.); the crystals melt at 166–168° C.

Elementary analysis gives the following result:

Found (percent): C, 58.11; H, 5.33; N, 16.85. Calculated (percent): C, 58.29; H, 5.30; N, 17.00.

The infrared spectrum shows, through the presence of bands for an aromatic ring and bands for the hydantoin skeleton, that the desired product has been produced. This finding is further confirmed by the presence of three amide-N—H frequencies (3280 cm.$^{-1}$, 3202 cm.$^{-1}$ and 3095 cm.$^{-1}$) and by three carbonyl absorption bands (1782 cm.$^{-1}$, 1740 cm.$^{-1}$ and 1710 cm.$^{-1}$).

The proton-magnetic resonance spectrum (60 Mc-NMR, recorded in deuterochloroform at 35° C., with tetramethylsilane as the internal standard) also shows, through the presence of the signals for the aromatic ring at $\delta=6.95$–$7.55$ (multiplet) and the signals for the $CH_3$ and N—H group of the hydantoin, in addition to the signal for the urea-amide (N—H) group, that the end product obtained has the structure given below:

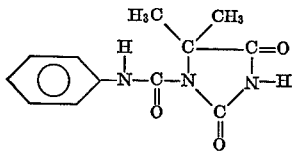

A sample of 70 g. of the compound thus synthesized is investigated, in a glass flask with a descending condenser and thermometer, for thermal re-decomposition into phenylisocyanate and dimethylhydantoin. At a bath temperature of 175° C., the substance is completely fused and is at a temperature of 168° C.; no signs of a decomposition are detectable. The temperature of the sample is now rapidly raised to 205° C. and here again no trace of a decomposition is as yet visible. At 215° C., very slight bubble formation in the melt is detectable. At 232° C. a slow decomposition starts and at 240° C. sample temperature phenylisocyanate begins to distil off. At 260° C. a relatively rapid distillation commences.

On the basis of this experiment, the decomposition point of the substance can be given as about 215–225° C., whilst urethanes of primary aliphatic alcohols and aromatic isocyanates already decompose from about 200° C. onwards.

(b) The following experiment shows that 3-glycidyl-5,5-dimethylhydantoin and phenylisocyanate as a model substance react smoothly and in good yield with one another, as follows:

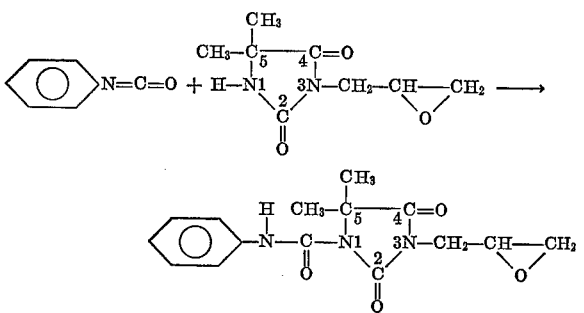

The isocyanate group thus reacts with the $N_1$—H group of the hydantoin analogously to the model experiment (a), to give a stable adduct, whilst the glycidyl group remains intact.

A mixture of 36.8 g. (0.2 mol) of 3-glycidyl-5,5-dimethylhydantoin (melting point 85–87° C., epoxide content 5.44 equivalents/kg.=100% of theory), 100 ml. of dioxane and 23.8 g. of phenylisocyanate (0.2 mol) is first prepared at room temperature, resulting in a clear, colourless solution. The solution is stirred at 125° C. bath temperature; hereupon an internal temperature of 104–107° C. is produced. The mixture is kept for 150 minutes at this temperature and is then cooled to room teperature, filtered and completely concentrated on a rotary evaporator at 70° C. under a waterpump vacuum; thereafter the material is dried to constant weight at 70° C. under 0.1 mm. Hg; hereupon, the reaction product crystallises out.

60.6 g. (yield: 100% of theory) of practically colourless crystals, with 2.95 epoxide equivalents/kg. (89.4% of theory), are obtained.

For purification, the product is recrystallised from acetone. Colourless crystals are thereby obtained, melting at 92–93.5° C. The expoxide content of the purified product is 3.18 equivalents/kg., corresponding to 96.4% of theory.

Elementary analysis shows the following:

Found (percent): N, 13.85. Calculated (percent): N, 13.86.

The infrared spectrum (ground paste with Nujol) shows, in contrast to the end product from model experiment a for the hydantoin mixture only one remaining amide-(N—H) frequency at 3320 cm.$^{-1}$, but the same bands for the carbonyl group and for the aromatic ring as the end product from model experiment a; additionally, the absorptions of the glycidyl group are now still visible.

The proton-magnetic resonance spectrum also agrees with the structure given below.

The ultraviolet spectrum (recorded in chloroform, concentration: $10^{-4}$ mol/litre) shows a $\lambda_{max.}$ at 249 μm., with an extinction $E_1{}^1$ max. of 15,100.

Further, the mass spectrum proves the structure shown below. The molecule-ion appears very clearly at 303 mass units and this agrees with the theoretical molecular weight of 303.3. The fragment-ion at 184 mass units probably originates through isocyanate being split from the molecule-ion.

The product thus consists of the monoepoxide of the structure:

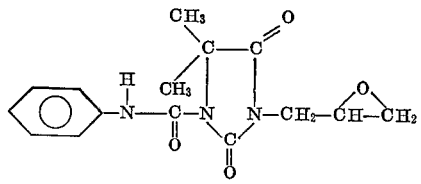

(C) MANUFACTURING EXAMPLES

Example 1

A mixture of 126 g. (0.297 mol) of the N,N'-bis-(5,5-dimethyl-hydantoin-1-carbonyl) - hexamethylenediamine manufactured according to instruction (A)(1)(a), 832 g. of epichlorohydrin and 1.48 g. of tetraethyleneammonium chloride is stired for 60 minutes at 90° C. Hereupon a colourless, clear solution is produced.

Thereafter, a circulatory distillation is established at 140° C. bath temperature by application of vacuum (60–90 mm. Hg) in such a way as to result in an internal temperature of 60° C. 57.0 g. of a 50% strength aqueous sodium hydroxide solution are now added dropwise, with vigorous stirring, over the course of two hours. At the same time the water present in the reaction mixture is continuously removed azeotropically, and separated off. The batch is then further distilled azeotropically for 20 minutes to remove the last traces of water.

The mixture is then cooled to about 35° C. and the sodium chloride produced in the reaction is removed by filtration. The filter residue is rinsed with 100 ml. of epichlorohydrin. The combined epichlorohydrin solutions are extracted by shaking with 150 ml. of water. After separating off the aqueous phase, the organic layer is extensively concentrated at 60° C. under a slight vacuum. 80 ml. of water are then added and the mixture is concentrated; additionally, 80 ml. of toluene are then added and the mixture completely concentrated at 65° C./20 mm. Hg. It is now dried to constant weight at 0.2 mm. Hg and 70° C.

153.1 g. of the desired diglycidyl compound (corresponding to a yield of 96.1% of theory) are obtained. The epoxide content is 3.78 equivalents/kg. (theory: 3.73 equivalents/kg.).

For purification, the colourless, crystalline, still somewhat tacky product can be recrystallised from methanol/tetrahydrofurane. Fine, colourless crystals melting at 153–155° C., are obtained. The epoxide content is 3.60 equivalents/kg. (yield: 96.6% of theory). The total chlorine content is 0.7%. The proton-magnetic resonance spectrum (60 Mc-HNMR, recorded in CDCl$_3$ 35° C., against tetramethylsilane) shows inter alia through the following signals and their integrals that the new resin has the structure given below:

$\delta$=1.73 (singlet)

$\delta$=2.55–2.90 (multiplet)

$\delta$=3.7–3.8 (doublet)

The product thus essentially consists of the diepoxide of the formula:

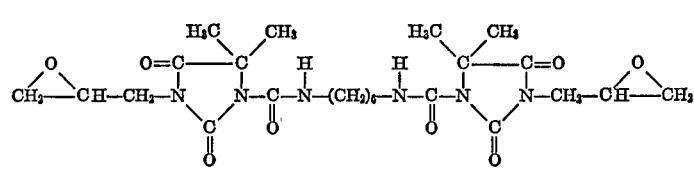

Example 2

540 g. (1.13 mols) of the N,N'-bis-(5,5-dimethyl-hydantoin - 1 - carbonyl) - 3,5,5-trimethyl-3-aminomethyl-cyclohexylamine-1 manufactured according to instruction (A)(1)(b), together with 3135 g. of epichlorohydrin (33.9 mols) and 5.62 g. of tetraethylammonium chloride, are stirred for 45 minutes at 90° C., whereby a clear, light ochre-coloured solution is produced.

The subsequent dehydrohalogenation with 218 g. of 50% strength aqueous sodium hydroxide solution is carried out in accordance with Example 1. The working up of the reaction product also takes place in accordance with the working instructions in Example 1.

666.4 g. of a highly viscous, light yellow, clear resin (yield: 99% of theory), having an epoxide content of 3.26 equivalents/kg. (98.3% of theory), are obtained. The product thus manufactured essentially consists of the diepoxide of the formula

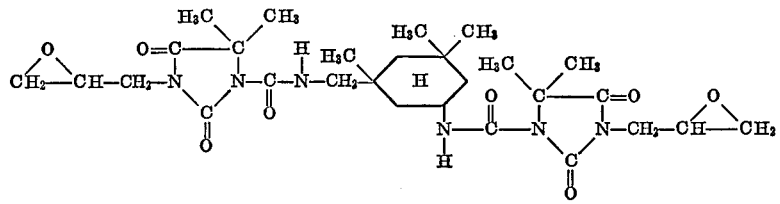

Example 3

A mixture of 465 g. (1.08 mols) of the N,N'-bis-(5,5-dimethyl - hydantoin - 1-carbonyl)-toluylene-2,4-diamine manufactured according to instruction (A)(1)(c), 2,995 g. of epichlorohydrin (32.4 mols) and 5.37 g. of tetraethylammonium chloride is reacted as described in Example 1. The dehydrohalogenation is carried out with 207 g. of 50% strength aqueous sodium hydroxide solution.

After working up in accordance with Example 1, 540 g. of a light brown, clear, transparent, viscous to solid resin (yield: 92.4% of theory) with 2.92 epoxide equivalents/kg. (79% of theory) are obtained.

The 60 Mc-HNMR spectrum (in CDCl$_3$ at 35° C., against tetramethylsilane) shows, through comparison of the integrals

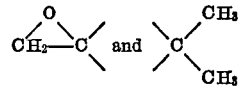

an epoxide content of 78.8% of theory. The product obtained thus essentially consists of the diepoxide of the following structure:

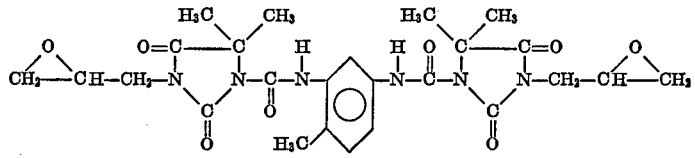

Example 4

A suspension of 167.5 g. (0.3525 mol) of the N,N'-bis - (5,5 - dimethyl - 6 - isopropyl-5,6-dihydrouracil-1-carbonyl) - 3,5,5 - trimethyl-3-aminomethyl-cyclohexylamine-1-manufactured according to instruction (A)(1)-(d), in 786 g. of epichlorohydrin (8.4973 mols), with the addition of 2.84 g. of tetraethylammonium chloride, is treated as described in Example 1.

The dehydrohalogenation is carried out with 54.4 g. of 50% strength aqueous sodium hydroxide solution in accordance with Example 1; the working up also takes place in accordance with the working instruction in Example 1.

248 g. of light, clear, viscous epoxide resin with 3.3 epoxide equivalents/kg. are obtained. The resin essentially consists of the diepoxide of the formula

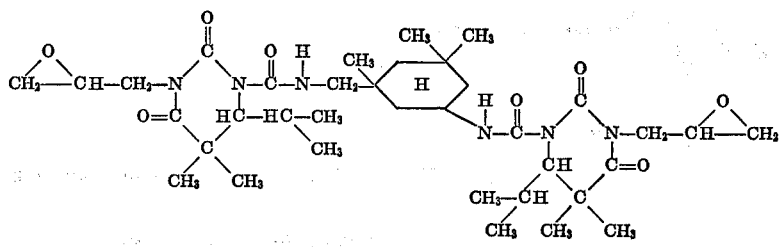

Example 5

330.7 g. of the N,N'-bis-(5,5-dimethyl-6-isopropyl-5,6-dihydrouracil-1-carbonyl)-hexamethylenediamine manufactured according to working instruction (A)(I)(e) are treated with 1,135.0 g. of epichlorohydrin and 3.05 g. of tetramethylammonium chloride in accordance with Example 1 and reacted with 118 g. of 50% strength sodium hydroxide solution as described in Example 1. After working up the reaction product analogously to Example 1, 398 g. of a viscous resin which slowly crystallises are obtained (yield: 100% of theory); its epoxide content is 3.4 equivalents/kg.

The epoxide resin can be recrystallised from ethanol. Colourless crystals having an epoxide content of 3.0 equivalents/kg. (97.3% of theory) are obtained; the total chlorine content is 1.5%. The proton-magnetic resonance spectrum (60 Mc-HNMR, 0.4 molar solution in CDCL₃ at 35° C., against tetramethylsilane) shows through the presence of, inter alia, the following signals, and their integration, that the new resin essentially has the structure given below:

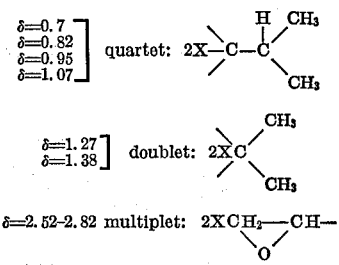

The product thus essentially consists of the diepoxide of the formula:

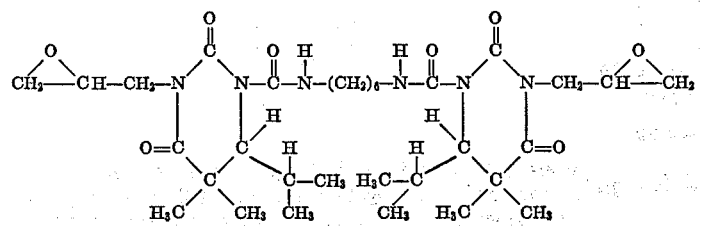

Example 6

234 g. of 3-glycidyl-5,5-dimethylhydantoin (1.27 mols), 282.4 ml. of chloroform and 141.2 g. of isophoronedi-isocyanate (0.635 mol) are successively introduced into a dry glass flask equipped with a stirrer, thermometer and reflux condenser. The resulting colourless, clear solution, which initially has an isocyanate content of 8.12%, is stirred for 3 hours under reflux with exclusion of moisture (internal temperature 75-78° C.). The isocyanate content hereupon drops to 0.66%. To complete the reaction, the mixture is stirred for a further 120 minutes under the abovementioned conditions, in the course of which the isocyanate content practically falls to zero.

The chloroform is now removed by distilling it off on a rotary evaporator. Thereafter the product is dried to constant weight at 65° C./0.1 mm. Hg.

365.5 g. of a practically colourless, brittle epoxide resin (yield: 97.5% of theory), softening at 75° C. (Kofler) are obtained; its epoxide content is 3.39 equivalents/kg. (100% of theory).

The molecular weight determined by vapour pressure osmometry (measured in dimethylformamide at 100° C. at four concentrations, and extrapolated to concentration to c.→0) is M=591. The theoretical molecular weight is 590.7. The product essentially consists of the same diepoxide as the diepoxide described in Example 2, of structure:

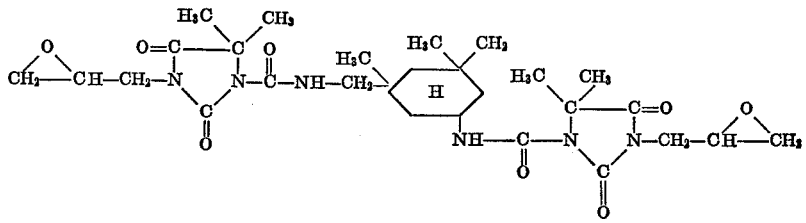

Example 7

240 g. of 3-glycidyl-5,5-dimethyl-6-isopropyl-5,6-dihydrouracil (1.0 mol) and 250 ml. of dioxane are stirred at 100-104° C. under reflux in a glass apparatus analogous to that of Example 6, additionally provided with a dropping funnel. A solution of 111 g. of isophoronediisocyanate in 250 ml. of dioxane is added dropwise, over the course of 25 minutes, to the clear and colourless solution. The mixture is thereafter stirred for a further 5 hours at 103-104° C. The reaction product is worked up analogously to Example 6.

A colourless powder of epoxide content 2.4 equivalents/kg. (84.2% of theory) is obtained in quantitative yield (351 g.). The product essentially consists of the same diepoxide as the diepoxide described in Example 4, of structure:

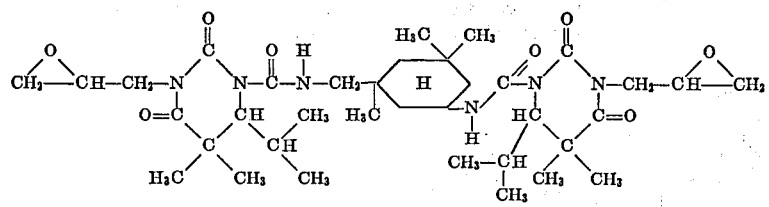

Example 8

177.2 g. (3 mols) of the bis-hydantoin-diglycidyl compound manufactured according to Example 2, of epoxide content 3.26 equivalents/kg., and 1,100 g. of epichlorohydrin (12 mols) are reacted, analogously to Example 1, with 60 g. of 50% strength aqueous sodium hydroxide solution under the catalytic action of 3.9 g. of 50% strength aqueous tetramethylammonium chloride solution. Working up also takes place in accordance with Example 1. A clear, light yellow, highly viscous resin of epoxide content 4.74 equivalents/kg. is obtained in 99.5% yield (200 g.); the epoxide content corresponds to 83.3% of theory, relative to the tetraglycidyl compound. The product obtained essentially consists of the tetraglycidyl compound of the following structure

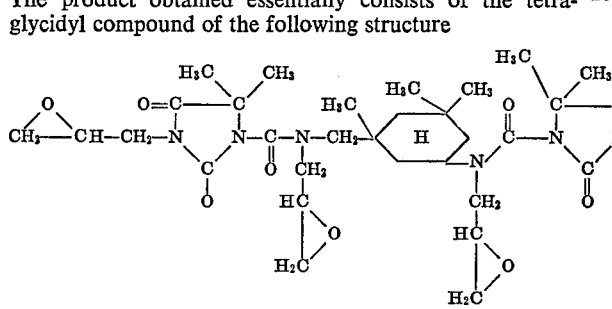

The experiment shows that under suitable conditions the urea-NH groups of the bis-hydantoin compounds can thus also be glycidylated. The tetraglycidylation can, under suitable conditions, also be achieved directly in one reaction step.

(D) USE EXAMPLES

Example I 203 g. of the epoxide resin manufactured according to Example 2, having an epoxide content of 3.26 epoxide equivalents/kg., are mixed with 98 g. of hexahydrophthalic anhydride at 80° C. and 0.5 g. of benzyldimethylamine are added to the clear melt. This mixture is poured into aluminium moulds of 4 mm. wall thickness, prewarmed to 80° C. Curing takes place in accordance with the following cycle: 2 hours/80° C.+2 hours/150° C. +12 hours/150° C. Clear, light yellow mouldings having the following properties are obtained:

Flexural strength (VSM 77,103), kp./mm.² _____ 6.8
Heat distortion point according to Martens (DIN 53,458), ° C. _____ 98

Example II 134 g. of the epoxide resin manufactured in accordance with Example 4, containing 3.3 epoxide equivalents, are processed with 66.0 g. of hexahydrophthalic anhydride, and cured, analogously to Example I. Clear, dark yellow mouldings having the following properties are obtained:

Arcing resistance according to ASTM 495: no tracking trace (the material subsequently melts)
Tracking resistance (VDE 0303), at 23° C.: level KA 3a/KA 3b

Example III 199.5 g. of the epoxide resin manufactured according to Example 5, containing 3.4 epoxide equivalents/kg., are processed with 100.5 g. of hexahydrophthalic anhydride and 0.5 g. of benzyldimethylamine analogously to Example I. Curing takes place analogously to the description in Example I. The mouldings obtained show the following electrical properties:

Tracking resistance (VDE 0303): level KA 3b
Arcing resistance (VDE 0303): level L 4

Example IV 2 samples of each of the epoxide compounds manufactured according to Examples 1, 2, 6 and 7 are warmed in a beaker and in each case one sample is rapidly mixed wth the equivalent amount of hexahydrophthalic anhydride and the other samples with equivalent amounts of isophoronediamine, and the mixtures are cured for 16 hours at 140° C. The glass transition temperatures of these cured samples are determined.

| Epoxide compound manufactured according to example | Glass transition temperature (° C.) after curing with— | |
|---|---|---|
| | Hexahydrophthalic anhydride | Isophoronediamine |
| 1 | 132 | 117 |
| 2 | 142 | 142 |
| 6 | 160 | 171 |
| 7 | 117 | |

We claim:
1. A binuclear N-heterocyclic polyglycidyl compound of the formula:

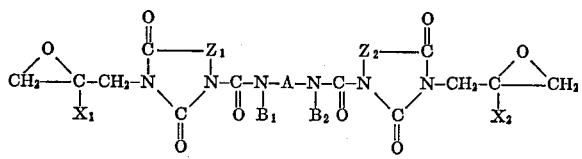

wherein $Z_1$ and $Z_2$ are the same and represent a group having the formula:

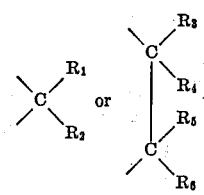

wherein $R_1$ and $R_2$ is hydrogen, alkyl of from 1 to 4 carbon atoms, or together are tetramethylene or pentamethylene; $R_3$, $R_4$, $R_5$, and $R_6$ each represent hydrogen or alkyl of from 1 to 4 carbon atoms; $B_1$ and $B_2$ is hydrogen, glycidyl or β-methylglycidyl $X_1$ and $X_2$ each represent hydrogen or methyl; and A is alkylene of from 1 to 10 carbon atoms, phenylene, tolylene, cyclohexylene, cyclopentylene, diphenylenemethane, or a group having the formula:

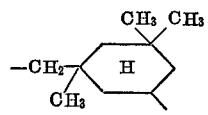

2. A compound as claimed in claim 1 of the formula

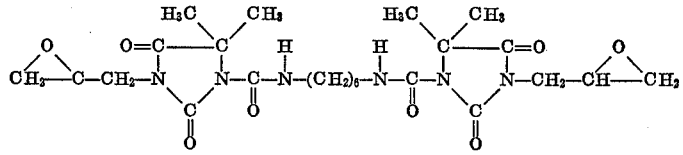

3. A compound as claimed in claim 1 of the formula

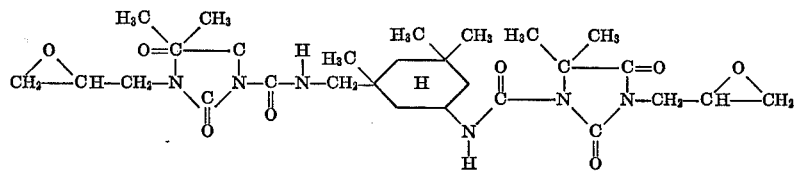

4. A compound as claimed in claim 1 of the formula

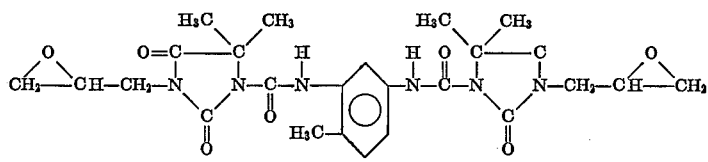

5. A compound as claimed in claim 1 of the formula

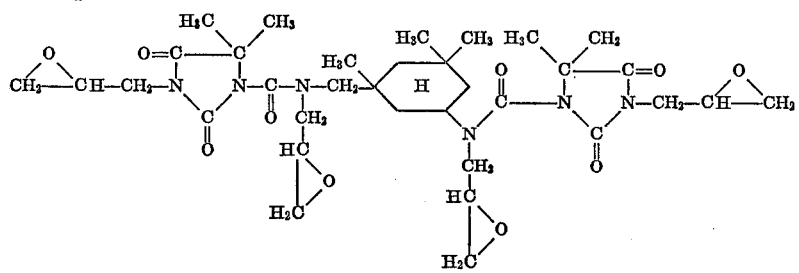

6. A compound as claimed in claim 1 of the formula

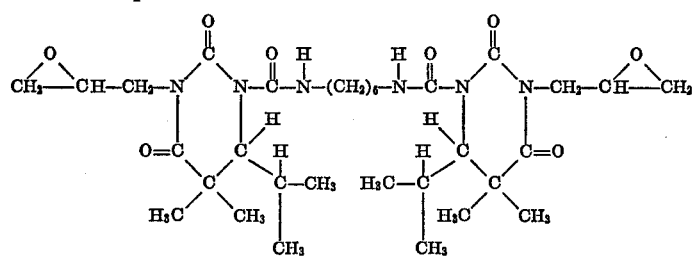

7. A compound as claimed in claim 1 of the formula

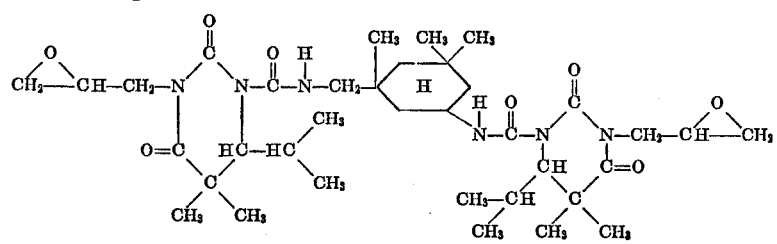

References Cited
UNITED STATES PATENTS

| | | | |
|---|---|---|---|
| 3,391,079 | 7/1968 | Williamson | 260—309.5 |
| 3,449,353 | 6/1969 | Porret et al. | 260—309.5 |
| 3,542,803 | 11/1970 | Porret | 260—309.5 |
| 3,591,590 | 7/1971 | Havg et al. | 260—260 |
| 3,592,823 | 7/1971 | Porret | 260—309.5 |
| 3,629,263 | 12/1971 | Batzer et al. | 260—309.5 |
| 3,644,365 | 2/1972 | Habermeier et al. | 260—260 |
| 3,676,455 | 7/1972 | Haug et al. | 260—309.5 |
| 3,679,681 | 7/1972 | Habermeier et al. | 260—309.5 |

NATALIE TROUSOF, Primary Examiner

U.S. Cl. X.R.

260—2 EP, 2 EA, 2 N, 2 EC, 13, 18 EP, 30.6 R, 31,8 E, 37 EP, 78.4 EP, 309.5, 824 EP, 830 P, 830 R, 831, 834, 835, 836